United States Patent
Lee et al.

(10) Patent No.: US 9,921,310 B2
(45) Date of Patent: Mar. 20, 2018

(54) PROXIMITY SENSOR AND PROXIMITY SENSING METHOD USING EVENT-BASED VISION SENSOR

(71) Applicant: SAMSUNG ELECTRONICS CO., LTD., Suwon-si (KR)

(72) Inventors: Jun Haeng Lee, Hwaseong-si (KR); Hyun Surk Ryu, Hwaseong-si (KR); Jae Yeon Won, College Station, TX (US); Keun Joo Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 848 days.

(21) Appl. No.: 14/037,950

(22) Filed: Sep. 26, 2013

(65) Prior Publication Data
US 2014/0085621 A1    Mar. 27, 2014

(30) Foreign Application Priority Data
Sep. 26, 2012    (KR) .................. 10-2012-0107431

(51) Int. Cl.
| | | |
|---|---|---|
| *G01C 3/08* | (2006.01) | |
| *G01S 17/06* | (2006.01) | |
| *G01S 7/481* | (2006.01) | |
| *G01S 17/46* | (2006.01) | |
| *G01S 17/50* | (2006.01) | |
| *G01S 7/493* | (2006.01) | |

(52) U.S. Cl.
CPC .............. *G01S 17/06* (2013.01); *G01S 7/481* (2013.01); *G01S 7/493* (2013.01); *G01S 17/46* (2013.01); *G01S 17/50* (2013.01)

(58) Field of Classification Search
CPC .......... G01S 17/06; G01S 7/481; G01S 7/493; G01S 17/46; G01S 17/50
See application file for complete search history.

(56) References Cited

U.S. PATENT DOCUMENTS

| | | | |
|---|---|---|---|
| 7,728,269 B2 | 6/2010 | Lichtsteiner et al. | |
| 2008/0065287 A1* | 3/2008 | Han | A01B 69/007 701/28 |

(Continued)

FOREIGN PATENT DOCUMENTS

| | | |
|---|---|---|
| GB | 2 395 261 A | 5/2004 |
| JP | 2003-172780 A | 6/2003 |
| KR | 10-0168087 B1 | 5/1999 |

(Continued)

OTHER PUBLICATIONS

Communication dated Mar. 29, 2016 issued European Patent Office in counterpart European Patent Application No. 13842660.6.

(Continued)

*Primary Examiner* — Samantha K Abraham
(74) *Attorney, Agent, or Firm* — Sughrue Mion, PLLC

(57) ABSTRACT

A proximity sensor and a proximity sensing method using an event-based vision sensor are provided. The proximity sensor may include a point identification (ID) unit which identifies a point at which an output light output from a focused light source is reflected from an object in an image taken by the proximity sensor; and a distance determination unit which determines a distance between the object and the proximity sensor based on a position of the point.

29 Claims, 9 Drawing Sheets

(56) References Cited

U.S. PATENT DOCUMENTS

2011/0234302 A1   9/2011   Utsunomiya et al.
2012/0139877 A1   6/2012   Kawabe et al.

FOREIGN PATENT DOCUMENTS

| KR | 10-2004-0002162 A | 1/2004 |
| KR | 1020060074503 A | 7/2006 |
| KR | 10-2008-0010768 A | 1/2008 |
| KR | 10-0825919 B1 | 4/2008 |
| KR | 100823870 B1 | 4/2008 |
| KR | 100825919 B1 * | 4/2008 |
| KR | 1020090106223 A | 10/2009 |
| KR | 1020090122806 A | 12/2009 |
| KR | 1020100097682 A | 9/2010 |
| KR | 1020110028922 A | 3/2011 |
| KR | 10-2011-0057083 A | 5/2011 |
| KR | 1020110090776 A | 8/2011 |

OTHER PUBLICATIONS

International Search Report for PCT/KR2013/008642 dated Jan. 16, 2014 [PCT/ISA/210].

* cited by examiner

PROXIMITY SENSOR AND PROXIMITY SENSING METHOD USING EVENT-BASED VISION SENSOR

CROSS-REFERENCE TO RELATED APPLICATION(S)

This application claims priority from Korean Patent Application No. 10-2012-0107431, filed on Sep. 26, 2012, in the Korean Intellectual Property Office, the disclosure of which is incorporated herein by reference in its entirety.

BACKGROUND

1. Field

The following description relates to a proximity sensor and a proximity sensing method using an event-based vision sensor, and more particularly, to a proximity sensor and a proximity sensing method which identify a position in which an output light is reflected from an object by the event-based vision sensor and measure a distance between the object and the proximity sensor using the identified position.

2. Description of the Related Art

A proximity sensor outputs an output light for a predetermined time and determines proximity of an object using a sum total of reflected light reflected from the object.

Conventional proximity sensors are sensitive to environmental changes and subject to noise. For example, when the sum total of reflected light is increased due to a reflected light related to light output by other light sources, such as the sun or a fluorescent lamp, accuracy of determining the proximity may be reduced.

In addition, since the conventional proximity sensors use the sum total of reflected light, a distance between the object and the proximity sensor may not be measured.

Accordingly, there is a desire for a proximity sensor capable of accurately measuring the distance to the object even when noise is present.

SUMMARY

According to an aspect of an exemplary embodiment, there is provided a proximity sensor including a point identification (ID) unit configured to identify a point in an image at which light output from a focused light source is reflected from an object, and a distance determination unit configured to determine a distance between the object and the proximity sensor based on a position of the point in the image.

The distance determination unit may determine the distance between the object and the proximity sensor using an angle at which the light is output toward the object, a distance between the proximity sensor and the focused light source, and the position of the point in the image.

The distance determination unit may determine the distance between the object and the proximity sensor to be proportional to a distance from a side edge of the image, corresponding to the focused light source, to the position of the point in the image.

The distance determination unit may determine the distance between the object and the proximity sensor to be proportional to a size of the image and a distance between the proximity sensor and the focused light source.

The distance determination unit may determine whether the object approximates the proximity sensor based on a movement direction of the point in the image.

The proximity sensor may further include a pattern detection unit which detects an event pattern of a reflected light reflected from the object with temporal change of the output light, wherein the point ID unit identifies the point in the image based on the event pattern of the reflected light.

The point ID unit may distinguish the point and a noise generated by another light source using the event pattern.

According to an aspect of an exemplary embodiment, there is provided a region identification (ID) unit configured to identify a region in an image in which light output from a scattered light source is reflected from an object, and a distance determination unit configured to determine a distance between the object and the proximity sensor based on a position of the region in the image.

The proximity sensor may include a lens configured to focus the light output by the scattered light source to a focus position separated from the proximity sensor by a predetermined distance.

The distance determination unit may determine the distance between the object and the proximity sensor using a size of the region and a position of a focus of the scattered light source.

According to an aspect of an exemplary embodiment, there is provided a method of determining a distance between a proximity sensor and an object including identifying a point in an image at which light output from a focused light source is reflected from the object, and determining the distance between the object and the proximity sensor based on a position of the point in the image.

According to an aspect of an exemplary embodiment, there is provided a method of determining a distance between a proximity sensor and an object including identifying a region in an image in which light output from a scattered light source is reflected from an object, and determining a distance between the object and the proximity sensor based on a position of the region in the image.

Other aspects of the exemplary embodiments will be apparent from the following detailed description, the drawings, and the claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a particular order. In addition, respective descriptions of well-known functions and constructions may be omitted for increased clarity and conciseness.

Figure 1:
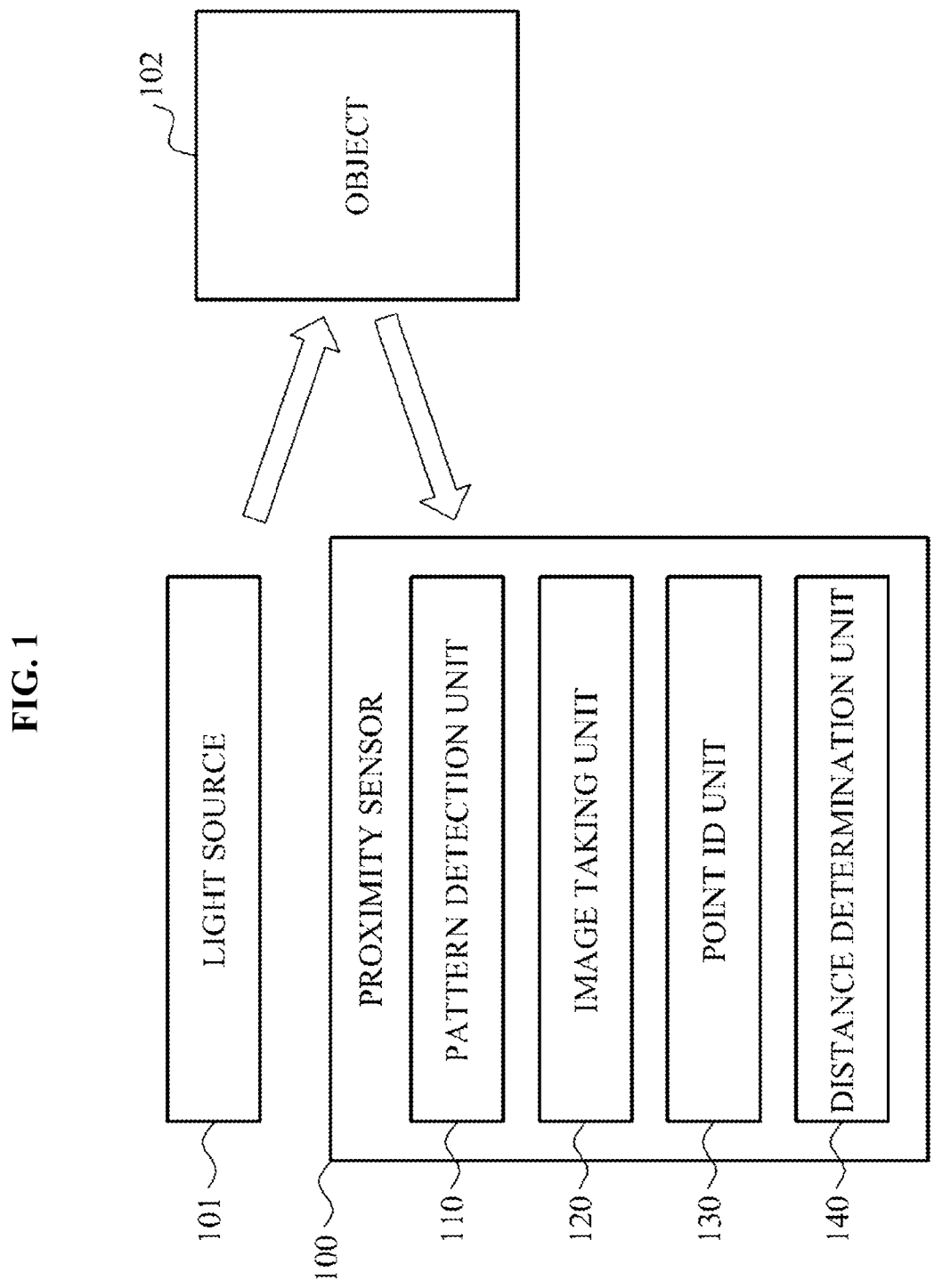
FIG. 1 is a diagram illustrating a proximity sensor according to an exemplary embodiment.

FIG. 1 is a diagram illustrating a proximity sensor 100 according to an exemplary embodiment.

The proximity sensor 100 may determine a distance between an object 102 and the proximity sensor 100 using a position of a point at which an output light output from a light source 101 is reflected from the object 102. For example, the proximity sensor 100 may be an event-based vision sensor, such as a design vision sensor (DVS).

The light source 101 may be a focused light source of which an output light is not scattered according to a distance. For example, the light source 101 may be a light amplification by stimulated emission of radiation (LASER). In addition, the light source 101 may change intensity of the output light according to at least one of a predetermined time interval, a particular condition, and a user operation. For example, the particular condition may be set so that the light source 101 changes the intensity of the output light when a distance between the object 102 and the proximity sensor 100 is unchanged for at least a predetermined time.

The object 102 may be any type of object, such as a user or other object.

Referring to FIG. 1, the proximity sensor 100 may include a pattern detection unit 110, an image taking unit 120, a point identification (ID) unit, and a distance determination unit 140.

The pattern detection unit 110 may detect an event pattern of a reflected light, which is the output light of the light source 101 reflected from the object 102.

Here, the event pattern may be designed in such a manner that intensity of the reflected light is increased or decreased by a predetermined amount or a predetermined rate according to time. The intensity of the reflected light may be increased or decreased according to the distance between the proximity sensor 100 and the object 102. For example, as the distance between the proximity sensor 100 and the object 102 is reduced, a proportion of the reflected light receivable by the pattern detection unit 110 out of the output light reflected from the object 102 may be increased. Accordingly, as the distance between the proximity sensor 100 and the object 102 is decreased, the intensity of the reflected light detected by the pattern detection unit 110 may be increased.

Conversely, as the distance between the proximity sensor 100 and the object 102 is increased, the proportion of the reflected light receivable by the pattern detection unit 110 out of the output light reflected from the object 102 may be decreased. Accordingly, as the distance between the proximity sensor 100 and the object 102 is increased, the intensity of the reflected light detected by the pattern detection unit 110 may be decreased.

The event pattern may correspond to a pattern in which the intensity of the output light is changed. For example, at a time point at which the light source 101 increases the intensity of the output light by a predetermined amount or a predetermined rate, the intensity of the reflected light may correspondingly increase in the event pattern detected by the pattern detection unit 110.

The pattern detection unit 110 may be a temporal contrast optical sensor adapted to detect a change in the intensity of light incident to a pixel of an image and thereby output events.

The temporal contrast optical sensor may output 'on events' when the intensity of light incident to the pixel is increased by a predetermined amount or a predetermined rate, and output 'off events' when the intensity of light incident to the pixel is decreased by a predetermined amount or a predetermined rate. In addition, the temporal contrast optical sensor may operate asynchronously without a frame, and may have time resolution of about 10 micro seconds (μs) or less. Accordingly, the change of the intensity of light of the event pattern of light reflected from the object may be compared to the change of the intensity of the light output by the light source to determine whether the change of the intensity of the light reflected from the object corresponds to the change of the intensity of the light output by the light source to distinguish the reflected light from noise.

Here, the image taking unit 120 may take an image including the object 102. The image taken by the image taking unit 120 may include a point at which the output light of the light source 101 is reflected by the object 102.

An output light from another light source may be reflected from the object 102 according to a movement of the object 102 or other various factors. For example, when the object 102 is disposed under a fluorescent lamp or the sun, output light of the fluorescent lamp or the sun may also be reflected from the object 102.

In this case, the image taken by the image taking unit 120 may include the point at which the output light of the light source 101 is reflected from the object 102 and a noise generated by the output light of another light source reflected by the object 102.

Another object may intervene between the object 102 and the proximity sensor 100. Here, since the other object is not an object for which proximity determination is desired, a point at which the output light is reflected by the other object may be the noise. For example, when hair of the user flutters, the output light may be reflected by the hair and therefore the point may be disposed at the hair. In this case, since the hair is not the object of proximity determination, and the point disposed on the hair may be considered as the noise.

The image taken by the image taking unit 120 will be described in detail with reference to FIGS. 2 and 3.

The point ID unit 130 may identify the point at which the output light is reflected from the object 102 in the image taken by the image taking unit 120. In a case that the light source 101 uses an output light in a primary color, such as red, a position in which the output light is reflected from the object 102 is changed in color by the output light, the point ID unit 130 may easily recognize the point.

In addition, based on the event pattern of the reflected light detected by the pattern detection unit 110, the point ID unit 130 may distinguish the point and the noise generated by another light source in the image taken by the image taking unit 120.

In detail, the event pattern of the reflected light reflected at the point may correspond to a temporal change of the output light of the light source 101. For example, at a time point at which the light source 101 changes the intensity of the output light, the intensity of the reflected light reflected from the point may be changed. Therefore, the event pattern of the reflected light may include 'on events' at the time point at which the light source 101 changes the intensity of the output light, and such events may be compared to corresponding events of the light source 101.

Conversely, the event pattern of the reflected light reflected at the noise is determined according to the change in the intensity of the output light output from the other light source or according to whether the output light output from the other light source is interrupted before reaching the object 102. Therefore, the event pattern may not correspond to the temporal change of the output light of the other light source.

Therefore, the point ID unit 130 may identify at least one point at which the output light is reflected and the noise in the image taken by the image taking unit 120, and distinguish the point from the noise by comparing the event pattern of the identified point or the noise with the temporal change of the output light of the light source 101. Here, the point ID unit 130 may store event patterns of the identified points. When the pattern detection unit 110 detects a new pattern, the point ID unit 130 may compare the new pattern with the stored event patterns, thereby controlling the noise.

The distance determination unit 140 may determine the distance between the object 102 and the proximity sensor 100 based on a position of the point identified by the point ID unit 130.

In detail, when the output light is output at a predetermined angle toward the object 102, the point may be moved in a direction away from the light source 101 according to an increase in the distance between the object 102 and the proximity sensor 100.

Therefore, the distance determination unit 140 may identify a direction corresponding to the position of the light source 101 on the image using a distance between the proximity sensor 100 and the light source 101, and determine the distance between the object 102 and the proximity sensor 100 using a distance between the position of the point and a side of the image corresponding to the identified direction. When the angle of the output light with respect to the object 102 is increased, the distance between the position of the point and the side of the image corresponding to the identified direction may be increased even though the distance between the object 102 and the proximity sensor 100 is constant.

Therefore, the distance determination unit 140 may determine the distance between the object 102 and the proximity sensor 100 using the angle at which the output light is output toward the object 102, the distance between the proximity sensor 100 and the light source 101, and the position of the point.

A process of determining the distance between the object 102 and the proximity sensor 100 by the distance determination unit 140 will be described in detail with reference to FIG. 2.

Additionally, the distance determination unit 140 may identify a movement direction of the point by comparing images successively taken by the image taking unit 120, and determine whether the object 102 approximates the proximity sensor 100 based on the movement direction of the point. In detail, the distance determination unit 140 determine that the object 102 approximates the proximity sensor 100 when the movement direction of the region corresponds to a direction of the light source 101 with respect to the proximity sensor 100. Also, the distance determination unit 140 may determine that the object 102 is separated from the proximity sensor 100 when the movement direction of the point is opposite to the direction of the light source 101 with respect to the proximity sensor 100.

In addition, according to a decrease in the distance between the object 102 and the proximity sensor 100, the intensity of the reflected light is increased and therefore a number of events output by the pattern detection unit 110 may be increased. That is, the number of events output by the pattern detection unit 110 may be inversely proportional to the distance between the object 102 and the proximity sensor 100.

Accordingly, the distance determination unit 140 may determine proximity of the object 102 using a number of events that correspond to the temporal change of the output light among the event patterns detected by the pattern detection unit 110.

Figure 2:
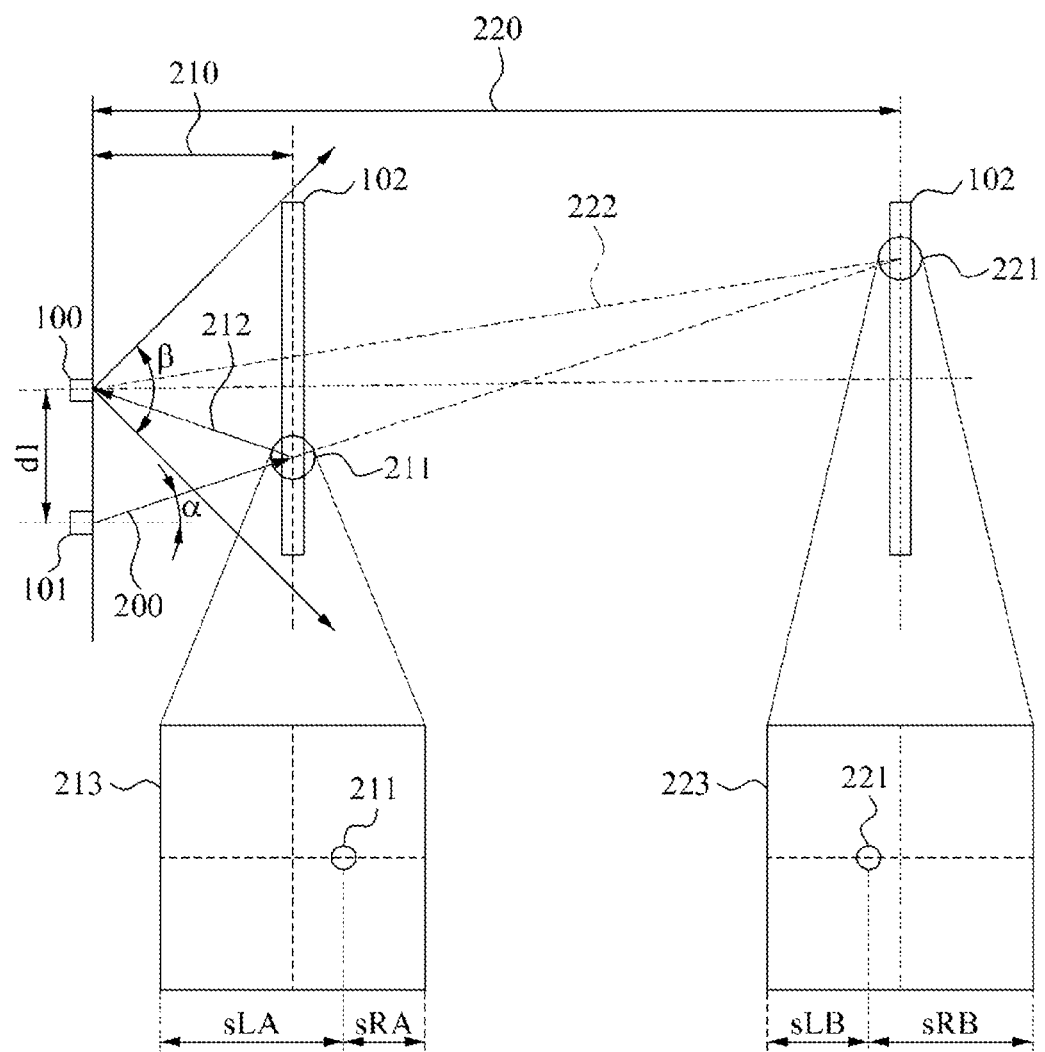
FIG. 2 is a diagram illustrating an operation of the proximity sensor according an exemplary embodiment.

FIG. 2 is a diagram illustrating an operation of the proximity sensor 100 according to an exemplary embodiment.

FIG. 2 is a top view of the proximity sensor 100. That is, the light source 101 may be disposed to the right of the proximity sensor 100.

The light source 101 may output an output light 200 at an angle α toward the object 102 as shown in FIG. 2.

When a distance 210 between the object 102 and the proximity sensor 100 is relatively short, the output light 200 may be reflected at a point 211, and the proximity sensor 100 may detect an event pattern of a reflected light 212 reflected from the point 211. As shown in FIG. 2, the point 211 may be included in an image 213 taken by the image taking unit 120.

Here, when a detection angle β of the proximity sensor 100 is approximately 90°, the distance determination unit 140 may determine dX denoting the distance 210 between the object 102 and the proximity sensor 100 using Equation 1.

$$dX = \frac{d1 \times (sRA + sLA)}{(1 + \tan\alpha) \times sLA - (1 - \tan\alpha) \times sRA}$$ [Equation 1]

Here, as shown in FIG. 2, d1 denotes the distance between the proximity sensor 100 and the light source 101, sRA denotes a distance between a right side of the image 213 and the point 211, and sLA denotes a distance between a left side of the image 213 and the point 211.

When a distance 220 between the object 102 and the proximity sensor 100 is relatively long, the output light 200 may be reflected at a point 221, and the proximity sensor 100 may detect an event pattern of a reflected light 222 reflected from the point 221. As shown in FIG. 2, the point 221 may be included in an image 223 taken by the image taking unit 120.

Here, the output light 200 may be moved to the left more than when reflected from the point 211, brought into contact with the object 102, and reflected at the point 221. Therefore, the point 221 may be disposed on a more left than the point 211 as shown in FIG. 2.

The distance determination unit 140 may determine dX denoting the distance 220 between the object 102 and the proximity sensor 100, by substituting a distance sRB between a right side of the image 223 and the point 221 and a distance sLB between a left side of the image 223 and the point 211, for the distances sRA and sLA of Equation 1.

Figure 3:
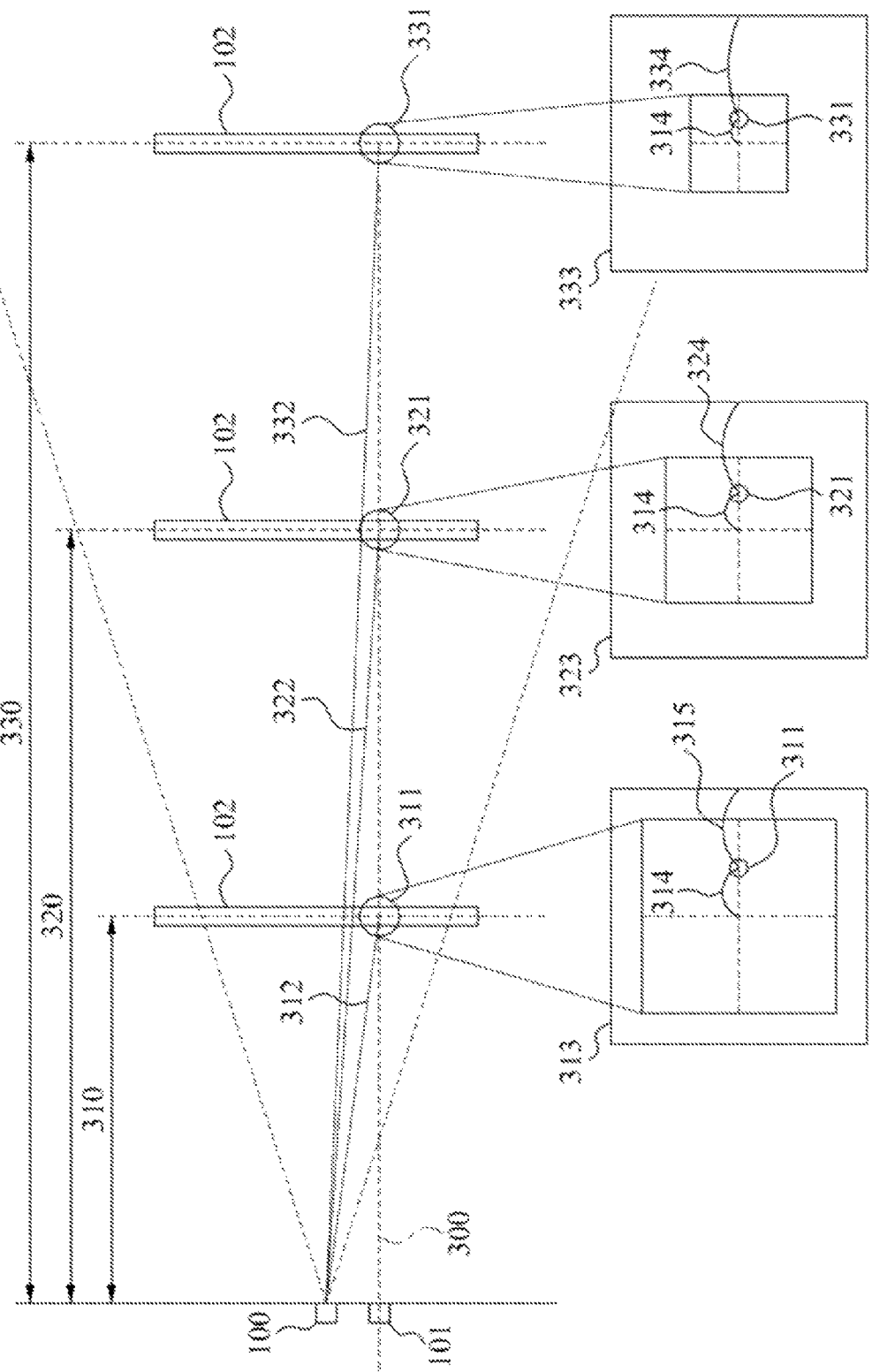
FIG. 3 is a diagram illustrating an operation of a proximity sensor according to another exemplary embodiment.

FIG. 3 is a diagram illustrating an operation of a proximity sensor according to another exemplary embodiment.

FIG. 3 is a top view showing the operation of the proximity sensor when an output light 300 is output orthogonally toward the object 102.

Again, the light source 101 may output the output light 300 at the angle α toward the object 102.

When a distance 310 between the object 102 and the proximity sensor 100 is relatively short, the output light 300 may be reflected at a point 311 and the proximity sensor 100 may detect an event pattern of a reflected light 312 reflected from the point 311. In addition, as shown in FIG. 3, the point 311 may be included in an image 313 taken by the image taking unit 120.

When a distance 320 between the object 102 and the proximity sensor 100 is intermediate, the output light 300 may be reflected at a point 321 and the proximity sensor 100 may detect an event pattern of a reflected light 322 reflected from the point 321. The point 321 may be included in an image 323 taken by the image taking unit 120.

When a distance 330 between the object 102 and the proximity sensor 100 is relatively long, the output light 300 may be reflected at a point 331 and the proximity sensor 100 may detect an event pattern of a reflected light 332 reflected from the point 331. The point 331 may be included in an image 333 taken by the image taking unit 120.

Here, since the output light 300 is orthogonal to the object 102, positions of the points 311, 321, and 331 may be equal in the object 102.

However, as shown in FIG. 3, the image taken by the image taking unit 120 may include a background or another object other than the object 102 as the distance between the object 102 and the proximity sensor 100 is increased. For example, the image 313 shows the object 102 in a large area. However, in the image 333, a size of the object 102 displayed is reduced in comparison to in the image 313.

That is, a distance 314 from a center of the object 102 to a point is uniform in the image 313, the image 323, and the image 333. However, a distance 315 from a right side of the image 313 to the point 311, a distance 324 from a right side of the image 323 to the point 321, and a distance 334 from a right side of the image 333 to the point 331 may be different from one another.

The distances 315, 324, and 334 from the right sides to the points of the images may correspond to the distances 310, 320, and 330 between the object 102 and the proximity sensor 100, respectively.

Accordingly, the distance determination unit 140 may determine the distance between the object 102 and the proximity sensor 100, using the distances 315, 324, and 334 from the right sides to the points of the images.

Figure 4:
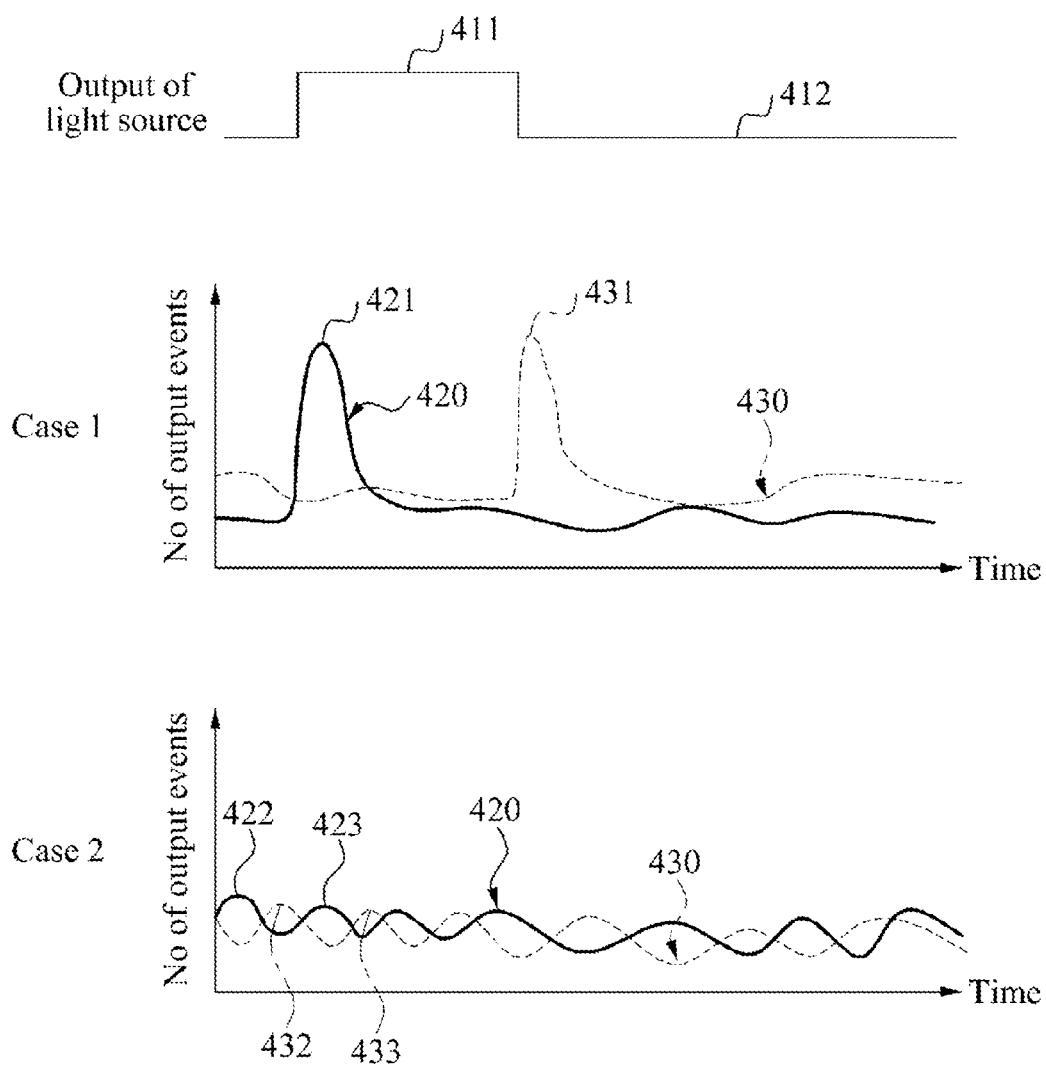
FIG. 4 is a diagram illustrating a process of removing noise, according to an exemplary embodiment.

FIG. 4 is a diagram illustrating a process of removing noise, according to an exemplary embodiment.

As shown in FIG. 4, the light source 101 may periodically change intensity of an output light between high 411 and low 412.

The pattern detection unit 110 may detect an event pattern of a reflected light which is the output light of the light source 101 reflected from an object 102.

However, when an output light from another light source contacts the object 102, the pattern detection unit 110 may detect an event pattern of reflected light as in a case 1 and an event pattern of reflected light as in a case 2, simultaneously.

Here, according to the event pattern of the case 1 as shown in FIG. 4, the pattern detection unit 110 may output events at a time point 421 and a time point 431. The event output by the pattern detection unit 110 at the time point 421 may be an 'on event' 420 indicating an increase of the intensity of reflected light. The event output by the pattern detection unit 110 at the time point 431 may be an off event 430 indicating a decrease of the intensity of reflected light.

The time point 421 may correspond to a time point at which the light source 101 changes the intensity of the output light to high 411. The time point 431 may correspond to a time point at which the light source 101 changes the intensity of the output light to low 412.

Accordingly, the reflected light corresponding to the event pattern of the case 1 may be the reflected light corresponding to the output light of the light source 101. The point ID unit 130 may identify a position in which the reflected light corresponding to the event pattern of the case 1 is reflected, as the point.

According to the event pattern of the case 2, the pattern detection unit 110 may output events at a time point 422, a time point 423, a time point 432, and a time point 433 as shown in FIG. 4.

The time point 422 at which the on event 420 is output may be different from the time point at which the intensity of the output light is changed to the high 411. The time point 432 and the time point 433 at which the 'off event' 430 is output may be different from the time point at which the intensity of the output light is changed to low 412.

However, the time point 423 at which the 'on event' 420 is output may be the same as the time point at which the intensity of the output light is changed to high 411, but may be one of time points at which a plurality of events are output, in the event pattern of the case 2.

Since the event pattern of the case 2 outputs the 'on event' 420 at one or more time points different from the time point at which the intensity of the output light is changed to high 411, the event pattern of the case 2 may be different from the temporal change of the output light of the light source 101. Therefore, the reflected light corresponding to the event pattern of the case 2 may be a noise. Alternatively, one or more 'off event' may be used to differentiate a reflected light from the output light of the light source 101.

Depending on conditions, the 'on event' 420 may be output at a time point different from the time point 431 in the event pattern of the case 1. Here, the point ID unit 130 may determine that a point is formed on another object as the other object temporarily passes through between the object 102 and the proximity sensor. Therefore, the point ID unit 130 may identify a point of the image taken by the image taking unit 120 at another time point as a noise expressed in the other object.

Figure 5:
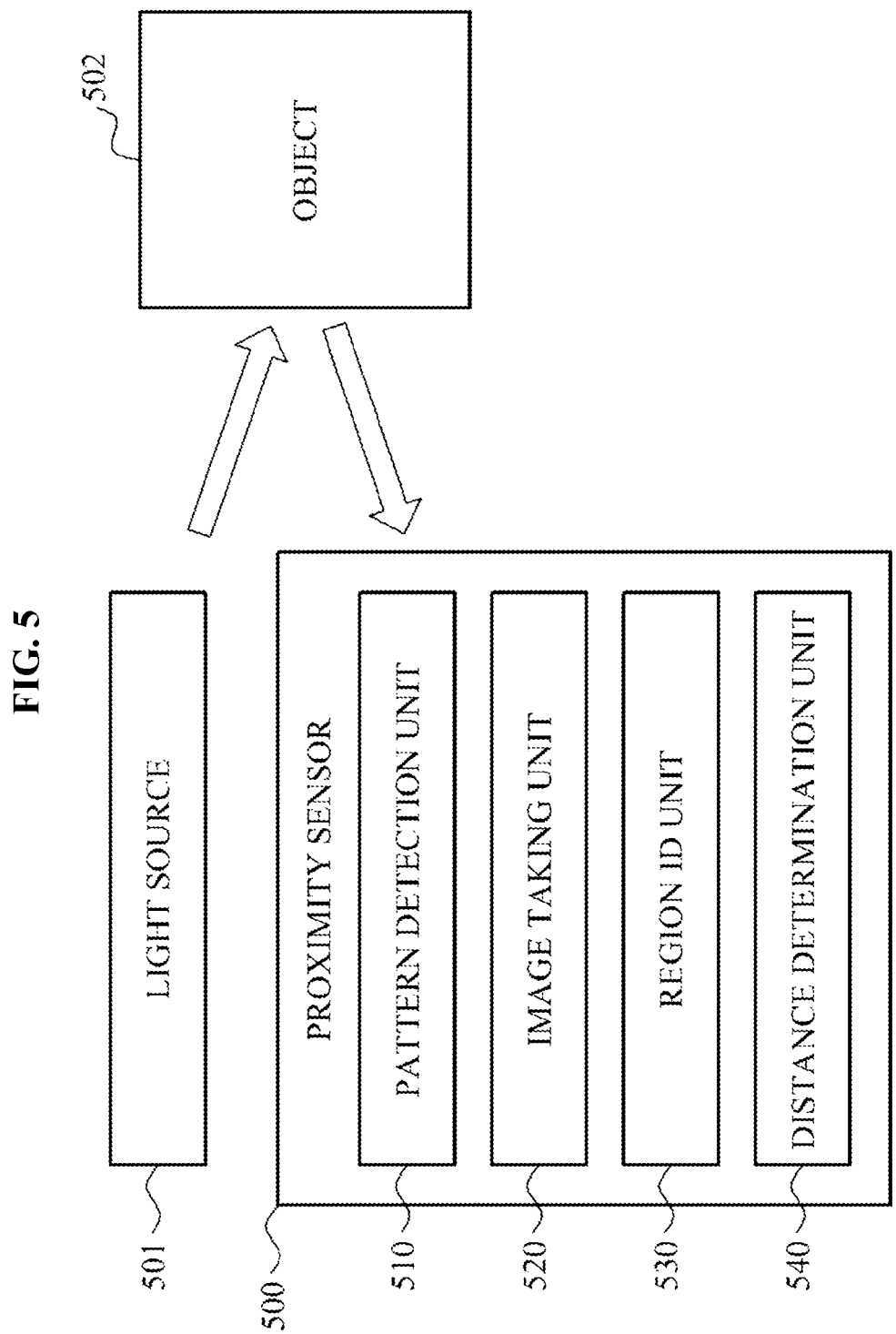
FIG. 5 is a diagram illustrating a structure of a proximity sensor according to an exemplary embodiment.

FIG. 5 is a diagram illustrating a structure of a proximity sensor 500 according to an exemplary embodiment.

The proximity sensor 500 may determine a distance between an object 502 and the proximity sensor 500 using a position of a point at which an output light output from a light source 501 is reflected from the object 502. For example, the proximity sensor 510 may be an event-based vision sensor, such as a DVS.

The light source 501 may be a scattered light source of which an output light is scattered according to a distance. For example, the light source 501 may be a light emitting diode (LED). In addition, the light source 501 may further include a lens for focusing the output light onto a focus position separated from the proximity sensor 500 by a predetermined distance. A focal distance may be determined according to a desired sensing range of the proximity sensor 500. In detail, when the output light focused by the lens passes through the focus position, the output light may be scattered. When the output light is scattered beyond a predetermined range, it may be difficult for the proximity sensor 500 to detect the reflected light. Therefore, the focal distance may be determined so that a scattering distance by which the output light scatters beyond a sensing range of the proximity sensor 500 is longer than a maximum desired sensing range of the proximity sensor 500.

The light source 501 may change an intensity of the output light according to at least one of a predetermined time interval, a particular condition, and a user operation. For example, the particular condition may be set so that the light source 501 changes the intensity of the output light by a predetermined amount, to a predetermined amount, or according to a rate of intensity change when a distance between the object 502 and the proximity sensor 500 is unchanged for at least a predetermined time.

Referring to FIG. 5, the proximity sensor 500 may include a pattern detection unit 510, an image taking unit 520, a region ID unit 530, and a distance determination unit 540.

The pattern detection unit 510 may detect an event pattern of a reflected light which is the output light of the light source 501 reflected from the object 502.

The event pattern may be designed in such a manner that intensity of the reflected light is increased or decreased by amount or rate according to time. The intensity of the reflected light may be increased or decreased by amount or rate according to the distance between the proximity sensor 500 and the object 502. For example, as the distance between the proximity sensor 500 and the object 502 is reduced, a proportion of the reflected light receivable by the pattern detection unit 510 out of the output light reflected from the object 502 may be increased. Accordingly, as the distance between the proximity sensor 500 and the object 502 is decreased, the intensity of the reflected light detected by the pattern detection unit 510 may be increased.

Conversely, as the distance between the proximity sensor 500 and the object 502 is increased, the proportion of the reflected light receivable by the pattern detection unit 510 out of the output light reflected from the object 502 may be decreased. Accordingly, as the distance between the proximity sensor 500 and the object 502 is increased, the intensity of the reflected light detected by the pattern detection unit 510 may be decreased.

In addition, the event pattern may correspond to a pattern in which the intensity of the output light is changed. For example, at a time point at which the light source 501 increases the intensity of the output light, the intensity of the reflected light may increase in the event pattern detected by the pattern detection unit 510.

The pattern detection unit 510 may be a temporal contrast optical sensor adapted to detect a change in the intensity of light incident to a pixel of an image and thereby output events.

The temporal contrast optical sensor may output 'on events' when the intensity of light incident to the pixel is increased, and output 'off events' when the intensity of light incident to the pixel is decreased. In addition, the temporal contrast optical sensor may operate asynchronously without a frame, and may have time resolution of about 10 μs or less.

Here, the image taking unit 520 may take an image including the object 502. The image taken by the image taking unit 520 may include a region in which the output light of the light source 501 is reflected by the object 502.

An output light output from another light source may be reflected from the object 502 according to a movement of the object 502 or other various factors. For example, when the object 502 is disposed under a fluorescent lamp or the sun, output light of the fluorescent lamp or the sun may be reflected from the object 502.

In this case, the image taken by the image taking unit 520 may include the point at which the output light of the light source 501 is reflected from the object 502 and a noise generated by the output light of another light source reflected by the object 502.

Another object may intervene between the object 502 and the proximity sensor 500. Here, since the other object is not an object of proximity determination like the object 502, a region in which the output light is reflected by the other object may be the noise. For example, when hair of the user flutters, the output light may be reflected by the hair and therefore the region may be disposed at the hair. In this case, since the hair is not the object of proximity determination, the region disposed on the hair may be considered as the noise.

The image taken by the image taking unit 520 will be described in detail with reference to FIG. 7.

The region ID unit 530 may identify the region at which the output light is reflected from the object 502 in the image taken by the image taking unit 520. In a case that the light source 501 uses an output light in a primary color such as red, a position in which the output light is reflected from the object 502 is changed in color by the output light, the point ID unit 530 may easily recognize the region.

Here, the output light may be focused onto the focus position by a lens of the light source 501. That is, as the object 502 is nearer to the focus position, the output light reflected from the object 502 may be focused and reduced in area. Accordingly, as the object 502 is nearer to the focus position, a size of the region identified by the region ID unit 530 may be reduced.

In addition, based on the event pattern of the reflected light detected by the pattern detection unit 510, the region ID unit 530 may distinguish the region and the noise generated by another light source in the image taken by the image taking unit 520.

In detail, the event pattern of the reflected light reflected at the region may correspond to a temporal change of the output light of the light source 501. For example, at a time point at which the light source 501 changes the intensity of the output light, the intensity of the reflected light reflected from the region may be changed. Therefore, the event pattern of the reflected light may include 'on events' at the time point at which the light source 501 changes the intensity of the output light.

Conversely, the event pattern of the reflected light reflected at the noise is determined according to the change in the intensity of the output light output from the other light source or according to whether the output light output from the other light source is interrupted before reaching the object 502. Therefore, the event pattern may not correspond to the temporal change of the output light of the other light source.

Therefore, the region ID unit 530 may identify at least one region at which the output light is reflected and the noise in the image taken by the image taking unit 520, and distinguish the region from the noise by comparing the event pattern of the identified point or the noise with the temporal change of the output light.

The distance determination unit 540 may determine the distance between the object 502 and the proximity sensor 500 based on the position and the size of the region identified by the region ID unit 530.

In detail, when the output light is output at a predetermined angle toward the object 502, the region may be moved in a direction away from the light source 501 according to an increase in the distance between the object 502 and the proximity sensor 500.

Therefore, the distance determination unit 540 may identify a direction corresponding to the position of the light source 501 on the image using a distance between the proximity sensor 500 and the light source 501, and determine the distance between the object 502 and the proximity sensor 500 using a distance between the position of the region and a side of the image corresponding to the identified direction. When the angle of the output light with respect to the object 502 is increased, the distance between the position of the region and the side of the image corresponding to the identified direction may be increased even though the distance between the object 502 and the proximity sensor 500 is constant.

Therefore, the distance determination unit 540 may determine the distance between the object 502 and the proximity sensor 500 using the angle at which the output light is output toward the object 502, the distance between the proximity sensor 500 and the light source 501, and the position of the region.

Additionally, the distance determination unit 540 may determine the direction between the object 502 and the proximity sensor 500 using the size of the region. As described above, as the object 502 is located nearer to the focus position, the size of the region identified by the region ID unit 530 may be reduced. Therefore, when the size of the region is minimum, the distance determination unit 540 may determine the object 502 to be located at the focus position.

In addition, the distance determination unit 540 may identify a movement direction of the region by comparing images successively taken by the image taking unit 520, and determine whether the object 502 approximates the proximity sensor 500 based on the movement direction of the point. In detail, the distance determination unit 540 may determine that the object 502 approximates the proximity sensor 500 when the movement direction of the region corresponds to a direction of the light source 501 with respect to the proximity sensor 500. Also, the distance determination unit 540 may determine that the object 502 is separated from the proximity sensor 500 when the movement direction of the point is opposite to the direction of the light source 501 with respect to the proximity sensor 500.

In addition, according to a decrease in the distance between the object 502 and the proximity sensor 500, the intensity of the reflected light is increased and therefore a number of events output by the pattern detection unit 510 may be increased. That is, the number of events output by the pattern detection unit 510 may be inverse proportional to the distance between the object 502 and the proximity sensor 500.

Thus, the distance determination unit 540 may determine proximity of the object 502 using a number of events corresponding to the temporal change of the output light among the event patterns detected by the pattern detection unit 510.

Figure 6:
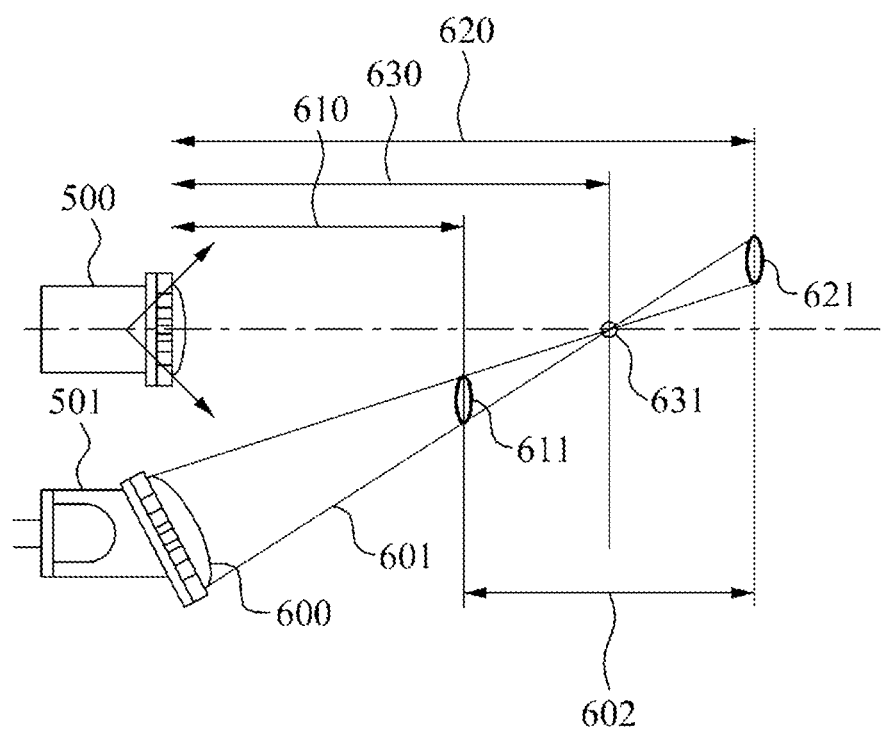
FIG. 6 is a diagram illustrating an operation of a proximity sensor according to still another exemplary embodiment.

FIG. 6 is a diagram illustrating an operation of the proximity sensor 500 according to still another exemplary embodiment.

FIG. 6 is a top view of the proximity sensor 500. That is, the light source 501 may be disposed on a right side of the proximity sensor 500. The light source 501 may output an output light 601 at a predetermined angle toward an object. In addition, since the light source 501 is a scattered light source, a lens 600 may be included, which focuses the output light 601 onto the focus position. Here, the focus position may be included in a range 602 to be sensed by the proximity sensor 500 and correspond to a center of an image taken by the proximity sensor 500.

When a distance 610 between the object and the proximity sensor 500 is shorter than a distance between the proximity sensor 500 and the focus position, the output light 601 may be reflected in a region 611 and the proximity sensor 500 may detect an event pattern of the reflected light reflected in the region 611. Here, since the output light 601 is being focused as shown in FIG. 6, the region 611 may have a predetermined size. The region 611 may be disposed on the right of the light source 501 with respect to the center of the image including the focus region.

Therefore, using the size and the position of the region 611, the distance determination unit 540 may determine the distance 610 between the object and the proximity sensor 500 to be shorter than the distance between the proximity sensor 500 and the focus position.

When a distance 620 between the object and the proximity sensor 500 is longer than the distance between the proximity sensor 500 and the focus position, the output light 601 may be reflected in a region 621 and the proximity sensor 500 may detect an event pattern of the reflected light reflected in the region 621. Here, since the output light 601 is being scattered as shown in FIG. 6, the region 621 may have a predetermined size.

The region 621 may be disposed on the left of the light source 501 with respect to the center of the image including the focus region.

Therefore, using the size and the position of the region 621, the distance determination unit 540 may determine the distance 620 between the object and the proximity sensor 500 to be longer than the distance between the proximity sensor 500 and the focus position.

When a distance 630 between the object and the proximity sensor 500 corresponds to the focus position, the output light 601 may be reflected in a region 631 and the proximity sensor 500 may detect an event pattern of the reflected light reflected in the region 631. Here, since the output light 601 is maximally focused as shown in FIG. 6, the region 631 may have a minimum size.

The region 631 may be located in the center of the image, corresponding to the focus region.

Therefore, using the size and the position of the region 631, the distance determination unit 540 may determine the distance 630 between the object and the proximity sensor 500 to be the distance between the proximity sensor 500 and the focus position.

Figure 7:
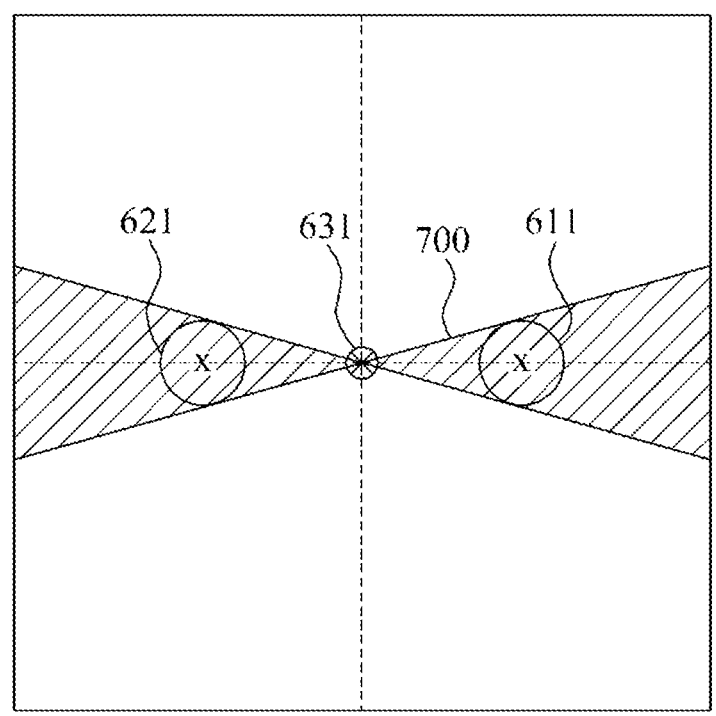
FIG. 7 is a diagram illustrating a region identified according to a movement of an object in a proximity sensor according to an exemplary embodiment.

FIG. 7 is a diagram illustrating a region identified according to a movement of an object in a proximity sensor according to an exemplary embodiment.

When a distance between the object and the proximity sensor 500 is less than a distance between the proximity sensor 500 and the focus position, the region 611 may have the predetermined size. The region 611 may be located on the right of the light source 501 with respect to the center of the image including the focus region.

Here, since the output light 601 is being focused, as shown in FIG. 6, a surface area of the output light 601 may be reduced in a direction toward a focal distance. Therefore, as shown in a region change 700 of FIG. 7, the size of the region 611 may be reduced as the object approximates the focus position.

In addition, as the object approximates the focus position, the output light 601 advancing toward the focus position may be reflected. Therefore, as shown in the region change 700 of FIG. 7, as the object approximates the focus position, the region 611 may be moved from the right to the center of the image. However, FIG. 7 shows the exemplary embodiment in which the light source 501 is located on the right of the proximity sensor 500, as shown in FIG. 6. For example, when the light source 501 is disposed at an upper portion of the proximity sensor 500, the region 611 may be moved from the upper portion to the center of the image as the object approximates the focus position.

That is, as the object approximates the focus position, the region 611 may be moved from a direction of the light source 501 with respect to the proximity sensor 500 toward the center of the image.

When the distance between the object and the proximity sensor 500 is greater than the distance between the proximity sensor 500 and the focus position, the region 621 may have the predetermined size.

Since the output light 601 is being scattered, the surface area of the output light 601 may be increased in a direction away from the focus position as shown in FIG. 6. Therefore, the size of the region 621 may be increased as the object is separated from the focus position, as shown in the region change 700 of FIG. 7.

Also, as the object is separated from the focus position, the output light 601 further advancing toward the object may be reflected. Therefore, as shown in the region change 700 of FIG. 7, as the object is separated from the focus position, the region 611 may be moved to the left of the image. However, FIG. 7 shows the exemplary embodiment in which the light source 501 is located on the right of the proximity sensor 500, as shown in FIG. 6. For example, when the light source 501 is disposed at the upper portion of the proximity sensor 500, the region 621 may be moved to a lower portion of the image as the object is separated from the focus position.

That is, as the object located at a further position than the focus position from the proximity sensor 500 is separated from the focus position, the region 621 may be moved in a direction opposite to the light source 501.

In addition, when the distance 620 between the object and the proximity sensor 500 corresponds to the focus position, since the output light 601 is maximally focused, as shown in FIG. 6, the region 631 may have the minimum size and may be located in the center of the image, corresponding to the focus region.

Figure 8:
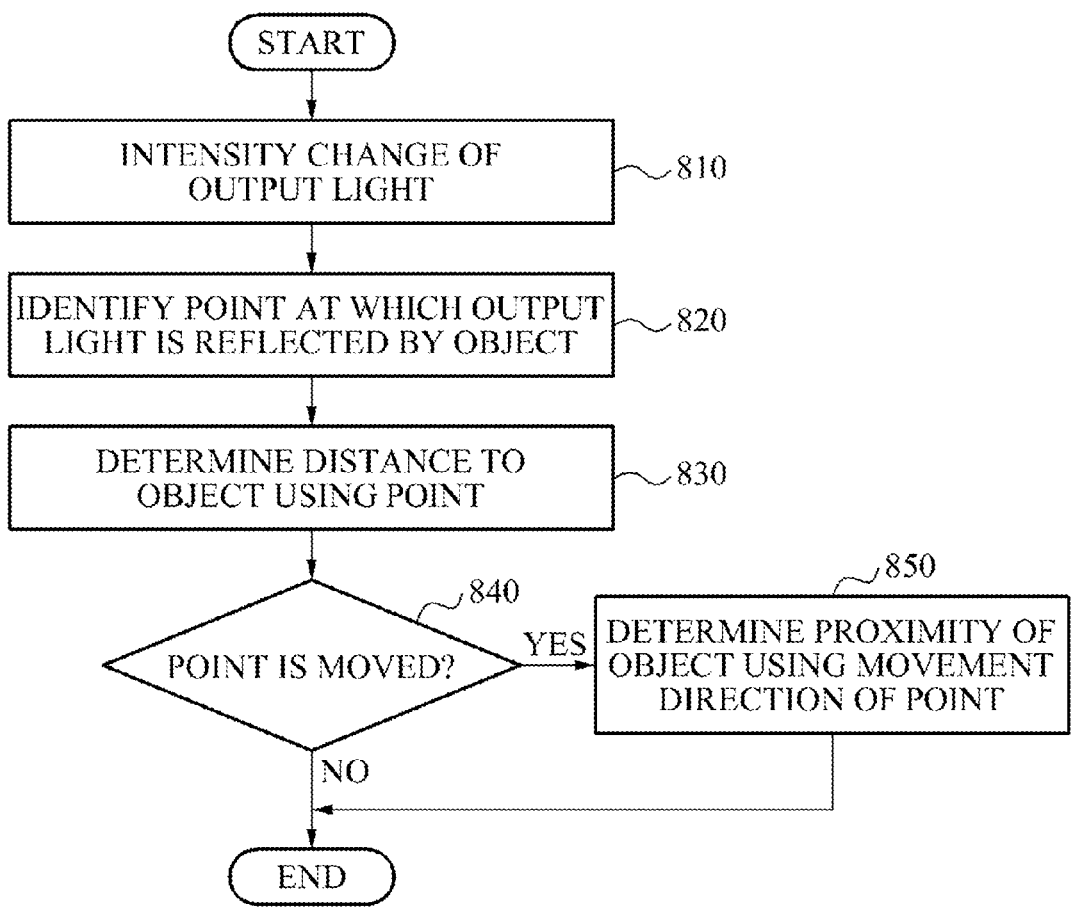
FIG. 8 is a diagram illustrating a proximity sensing method of a proximity sensor according to an exemplary embodiment.

FIG. 8 is a diagram illustrating a proximity sensing method of a proximity sensor according to an exemplary embodiment.

In operation 810, the light source 101 may change the intensity of an output light according to at least one of a predetermine time interval, a particular condition, and a user operation.

When the intensity of the reflected light reflected from the object 102 is changed according to a change in the intensity of the output light in operation 810, the pattern detection unit 110 may detect an event pattern of the reflected light. The image taking unit 120 may take the image including the object 102.

In operation 820, the point ID unit 130 may identify the point at which the output light is reflected from the object 102 in the image taken in operation 810.

The point ID unit 130 may distinguish the point and the noise generated from another light source in the image taken by the image taking unit 120 based on the event pattern of the reflected light detected in operation 810.

In detail, the event pattern of the reflected light reflected at the point may correspond to the temporal change of the output light of the light source 101. Conversely, the event pattern of the reflected light reflected at the noise is determined according to the change in the intensity of the output light output from the other light source or according to whether the output light output from the other light source is interrupted before reaching the object 102. Therefore, the event pattern may not correspond to the temporal change of the output light of the other light source. Therefore, the point ID unit 130 may identify at least one point at which the output light is reflected or the noise in the image taken by the image taking unit 120, and distinguish the point from the noise by comparing the event pattern of the identified point or the noise with the temporal change of the output light.

In operation 830, the distance determination unit 140 may determine the distance between the object 102 and the proximity sensor 100 based on the position of the point identified in operation 820.

In detail, when the output light is output at a predetermined angle toward the object 102, the point may be moved in a direction away from the light source 101 according to an increase in the distance between the object 102 and the proximity sensor 100. Therefore, the distance determination unit 140 may determine a direction corresponding to the position of the light source 101 on the image using the distance between the proximity sensor 100 and the light source 101, and determine the distance between the object 102 and the proximity sensor 100 using the distance between the position of the point and the side of the image corresponding to the identified direction.

In operation 840, the distance determination unit 140 may determine whether the point is moved by comparing images successively taken by the image taking unit 120.

In operation 850, when the point is confirmed to have moved in operation 840, the distance determination unit 140 may determine whether the object 102 approximates the proximity sensor 100 based on a movement direction of the point. In detail, when the movement direction of the point is the same as the direction of the light source 101 with respect to the proximity sensor 100, the distance determination unit 140 may determine that the object 102 approximates the proximity sensor 100. In addition, when the movement direction of the point is opposite to the direction of the light source 101 with respect to the proximity sensor 100, the distance determination unit 140 may determine that the object 102 is separated from the proximity sensor 100.

Figure 9:
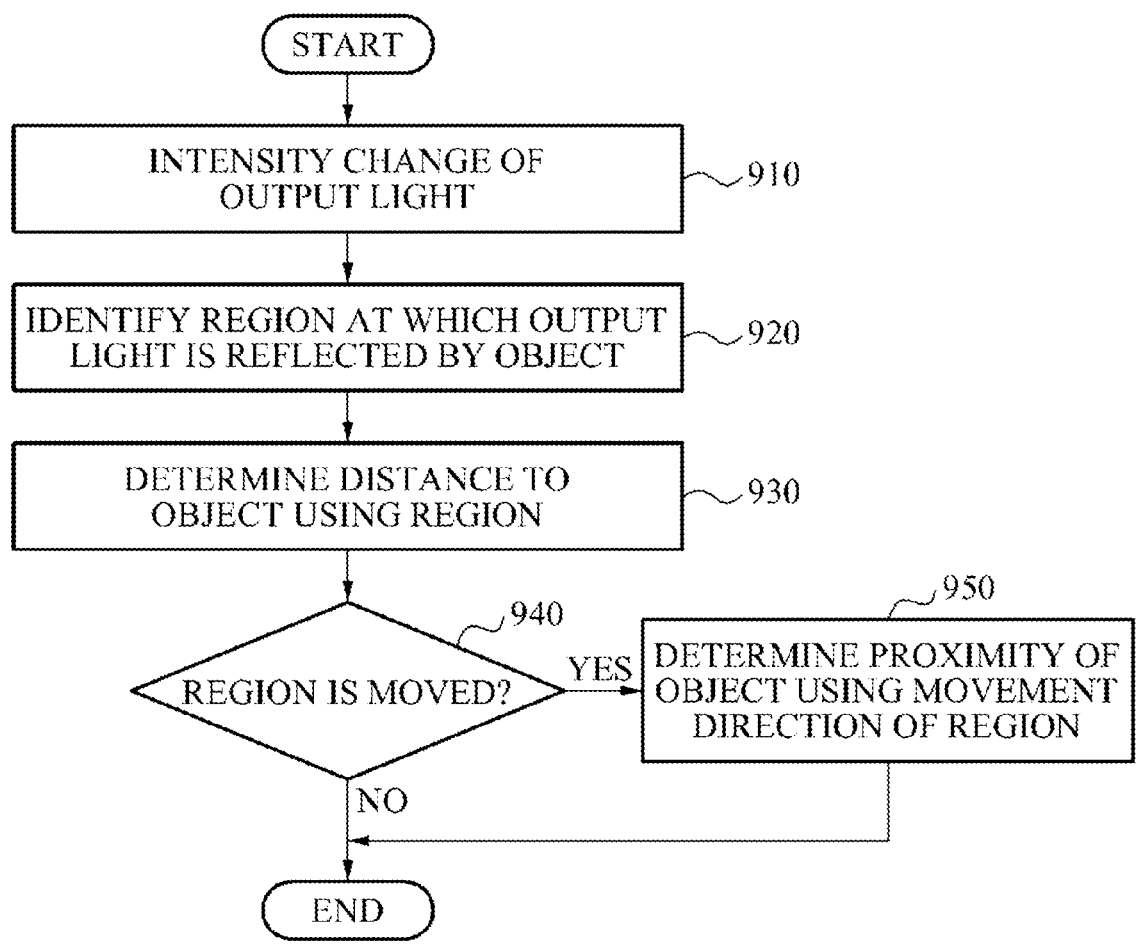
FIG. 9 is a diagram illustrating a proximity sensing method of a proximity sensor according to another exemplary embodiment.

FIG. 9 is a diagram illustrating a proximity sensing method of a proximity sensor according to another exemplary embodiment.

In operation 910, the light source 501 may change the intensity of the output light according to at least one of a predetermine time interval, a particular condition, and a user operation.

When the intensity of the reflected light reflected from the object 502 is changed according to a change in the intensity of the output light in operation 910, the pattern detection unit 510 may detect an event pattern of the reflected light. The image taking unit 520 may take the image including the object 502.

In operation 920, the point ID unit 530 may identify the region at which the output light is reflected from the object 502 in the image taken in operation 910. Here, the output light may be focused to the focus point by the lens of the light source 501. That is, as the object 502 is nearer to the focus position, the output light reflected from the object 502 may be focused and reduced in area. Accordingly, as the object 502 is nearer to the focus position, the size of the region identified by the region ID unit 530 may be reduced.

In addition, based on the event pattern of the reflected light detected by the pattern detection unit 510, the region ID unit 530 may distinguish the region and the noise generated by another light source in the image taken by the image taking unit 520.

In detail, the event pattern of the reflected light reflected at the region may correspond to a temporal change of the output light of the light source 501. Conversely, the event pattern of the reflected light reflected at the noise is determined according to the change in the intensity of the output light output from the other light source or according to whether the output light output from the other light source is interrupted before reaching the object 502. Therefore, the event pattern may not correspond to the temporal change of the output light of the other light source. Accordingly, the region ID unit 530 may identify at least one region at which the output light is reflected or the noise in the image taken by the image taking unit 520, and distinguish the region from the noise by comparing the event pattern of the identified point or the noise with the temporal change of the output light.

In operation 930, the distance determination unit 540 may determine the distance between the object 502 and the proximity sensor 500 based on the position and the size of the region identified in operation 920.

In detail, when the output light is output at the predetermined angle toward the object 502, the region may be moved in a direction away from the light source 501 according to an increase in the distance between the object 502 and the proximity sensor 500. Therefore, the distance determination unit 540 may identify a direction corresponding to the position of the light source 501 on the image using the distance between the proximity sensor 500 and the light source 501, and determine the distance between the object 502 and the proximity sensor 500 using the distance between the position of the region and the side of the image corresponding to the identified direction.

In addition, the distance determination unit 540 may determine the distance between the object 502 and the proximity sensor 500 using the size of the region. As the object 502 is nearer to the focus position, the size of the region identified by the region ID unit 530 may be reduced. Therefore, when the size of the region identified by the region ID unit 530 is minimized, the distance determination unit 540 may determine that the object 502 is located on the focus position.

In operation 940, the distance determination unit 540 may check whether the region is moved by comparing the images successively taken by the image taking unit 520.

In operation 950, when the region is confirmed to have moved in operation 950, the distance determination unit 540 may determine whether the object 502 approximates the proximity sensor 500 based on a movement direction of the point. In detail, when the movement direction of the point is the same as the direction of the light source 501 with respect to the proximity sensor 500, the distance determination unit 540 may determine that the object 502 approximates the proximity sensor 500. In addition, when the movement direction of the point is opposite to the direction of the light source 501 with respect to the proximity sensor 500, the distance determination unit 540 may determine that the object 502 is separated from the proximity sensor 500.

The above-described exemplary embodiments may be recorded in non-transitory computer-readable media as program instructions to implement various operations embodied by a computer that includes a processor executing the program instructions. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

A number of exemplary embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A proximity sensor comprising:
   a light source configured to emit light; and
   a point identification (ID) unit configured to, determine that light which is reflected from a position of an object and incident with respect to a first pixel of an image of the object is light which is emitted by the light source and reflected by the object at the position and incident with respect to the first pixel of the image, and determine that light which is reflected from the position of the object and incident with respect to a second pixel of the image is light which is emitted by another light source other than the light source and reflected by the object at the position and incident with respect to the second pixel of the image,
   wherein the proximity sensor comprises an event-based vision sensor.

2. The proximity sensor of claim 1, wherein the light source is configured to emit the light according to a pattern, and
   wherein the proximity sensor further comprises:
   an image capturing unit configured to capture the image of the object; and
   a pattern detection unit configured to compare the pattern of the light emitted by the light source to a first event pattern of the light incident with respect to the first pixel of the image and to a second event pattern of the light incident with respect to the second pixel of the image.

3. The proximity sensor of claim 2, wherein the point ID unit is configured to,
   determine that the light reflected from the position of the object is the light emitted by the light source and incident with respect to the first pixel of the image based on a result of the pattern detection unit indicating the pattern of the light emitted by the light source corresponds to the first event pattern, and determine that the light reflected from the position of the object is the light emitted by the other light source and incident with respect to the second pixel of the image based on a result of the pattern detection unit indicating the pattern of the light emitted by the light source does not correspond to the second event pattern.

4. The proximity sensor of claim 3, wherein the first event pattern comprises a change in intensity of the light incident with respect to the first pixel of the image, and the second event pattern comprises a change in intensity of the light incident with respect to the second pixel of the image and the second event pattern is different from the first event pattern.

5. The proximity sensor of claim 4, wherein the change in intensity of the light incident with respect to the first pixel of the image and the change in intensity of the light incident with respect to the second pixel of the image are an increase or decrease of a predetermined amount of intensity.

6. The proximity sensor of claim 4, wherein the change in intensity of the light incident with respect to the first pixel of the image and the change in intensity of the light incident with respect to the second pixel of the image are an increase or decrease of a predetermined rate of intensity.

7. The proximity sensor of claim 1, wherein the point ID unit is configured to determine that the light incident with respect to the first pixel of the image is the light emitted by the light source and incident with respect to the first pixel of the image and the light emitted by the other light source and incident with respect to the second pixel of the image based on comparisons of a pattern of the light emitted by the light source to a first event pattern of the light incident with respect to the first pixel of the image and to a second event pattern of the light incident with respect to the second pixel of the image.

8. The proximity sensor of claim 7, wherein the first event pattern comprises a change in intensity of the light incident with respect to the first pixel of the image, and the second event pattern comprises a change in intensity of the light incident with respect to the second pixel of the image and the second event pattern is different from the first event pattern.

9. The proximity sensor of claim 7, wherein the change in intensity of the light incident with respect to the first pixel of the image and the change in intensity of the light incident with respect to the second pixel of the image are an increase or decrease of a predetermined amount of intensity.

10. The proximity sensor of claim 7, wherein the change in intensity of the light incident with respect to the first pixel of the image and the change in intensity of the light incident with respect to the second pixel of the image are an increase or decrease of a predetermined rate of intensity.

11. A method of filtering noise from an image of an object based on light reflected from the object, the method comprising:
controlling a light source to emit the light onto the object;
capturing the image of the object;
determining, by an event-based vision sensor, that light which is reflected from a position of the object and incident with respect to a first pixel of the image is light which is emitted by the light source and reflected by the object at the position, and incident with respect to the first pixel of the image; and
determining, by the event-based vision sensor, that light which is reflected from the position of the object and incident with respect to a second pixel of the image is light which is emitted by another light source other than the light source and reflected by the object at the position and incident with respect to the second pixel of the image.

12. The method of claim 11, wherein the determining comprises:
comparing a pattern of the light emitted by the light source to a first event pattern of the light reflected from the object and incident with respect to the first pixel of the image;
comparing the pattern of the light emitted by the light source to a second event pattern of the light reflected from the object and incident with respect to the second pixel of the image;
determining that the light reflected from the object and incident with respect to the first pixel of the image is the light emitted by the light source and reflected by the object at the position and incident with respect to the first pixel of the image, based on a result of comparing the pattern to the first event pattern; and
determining that the light reflected from the object and incident with respect to the second pixel of the image is the light emitted by the other light source and reflected by the object at the position and incident with respect to the second pixel of the image, based on a result of comparing the pattern to the second event pattern.

13. The method of claim 12, wherein the first event pattern comprises a change in intensity of the light incident with respect to the first pixel of the image, and the second event pattern comprises a change in intensity of the light incident with respect to the second pixel of the image and the second event pattern is different from the first event pattern.

14. A non-transitory computer-readable medium having embodied thereon a program, which when executed by a computer causes the computer to execute a method of filtering noise from an image of an object based on light reflected from the object, the method comprising:
controlling a light source to emit the light onto the object;
capturing the image of the object; and
determining, by an event-based vision sensor, that the light which is reflected from a position of the object and incident with respect to a first pixel of the image is light which is emitted by the light source and reflected by the object at the position, and incident with respect to the first pixel of the image; and
determining, by the event-based vision sensor, that light which is reflected from the position of the object and incident with respect to a second pixel of the image is light which is emitted by another light source other than the light source and reflected by the object at the position and incident with respect to the second pixel of the image.

15. A proximity sensor comprising:
a point identification (ID) unit configured to, determine that light which is reflected from a first point of an object and incident with respect to a first pixel of an image of the object is light which is emitted by a focused light source and reflected by the object and incident with respect to the first pixel of the image, determine that light which is reflected from a second point of the object and incident with respect to a second pixel of the image is light which is emitted by another light source other than the focused light source and reflected by the object and incident with respect to the second pixel of the image, identify the first point in the image as being output from the focused light source and reflected from the object based on a result of the determination of light reflected from the object being emitted by the focused light source and reflected by the object, and identify the second point in the image as noise emitted by the other light source and reflected from the object based on a result of the determination of light reflected from the object being emitted by the other light source and reflected by the object; and a distance determination unit configured to remove the noise from the light reflected from the object and determine a distance between the object and the proximity sensor based on a position of the first point in the image, wherein the proximity sensor comprises an event-based vision sensor.

16. The proximity sensor of claim 15, wherein the distance determination unit is configured to determine the distance between the object and the proximity sensor using an angle at which the light is output toward the object, a distance between the proximity sensor and the focused light source, and the position of the first point in the image.

17. The proximity sensor of claim 15, wherein the distance determination unit is configured to determine the distance between the object and the proximity sensor to be proportional to a distance from a side edge of the image, corresponding to the focused light source, to the position of the first point in the image.

18. The proximity sensor of claim 15, wherein the distance determination unit is configured to determine the distance between the object and the proximity sensor to be proportional to a size of the image and a distance between the proximity sensor and the focused light source.

19. The proximity sensor of claim 15, wherein the distance determination unit is further configured to determine whether the object approximates the proximity sensor based on a movement direction of the first point in the image.

20. The proximity sensor of claim 15, further comprising a pattern detection unit configured to detect a first event pattern of the light reflected from the object and incident with respect to the first pixel of the image and a second event pattern of the light reflected from the object and incident with respect to the second pixel of the image, wherein the point ID unit is configured to, identify the first point in the image as light emitted by the focused light source and reflected by the object based on the first event pattern of the light reflected from the object and incident with respect to the first pixel of the image, and identify the second point in the image as the noise emitted by the other light source and reflected from the object based on the second event pattern of the light reflected from the object and incident with respect to the second pixel of the image.

21. The proximity sensor of claim 20, wherein the point ID unit is configured to distinguish the first point from the noise generated by the other light source based on comparisons of the first event pattern to a temporal change of the light output by the focused light source and the second event pattern to the temporal change of the light output by the focused light source.

22. A method of determining a distance between a proximity sensor and an object, the method comprising:

determining, by an event-based vision sensor, that light which is reflected from a first point of the object and incident with respect to a first pixel of an image of the object is light which is emitted by a focused light source and reflected by the object and incident with respect to the first pixel of the image;

determining, by the event-based vision sensor, that light which is reflected from a second point of the object and incident with respect to a second pixel of the image is light which is emitted by another light source other than the focused light source and reflected by the object and incident with respect to the second pixel of the image;

identifying the first point in the image as being output from the focused light source and reflected from the object based on a result of the determining of light reflected from the object being emitted by the focused light source and reflected by the object;

identifying the second point in the image as noise emitted by the other light source and reflected from the object based on a result of the determining of light reflected from the object being emitted by the other light source and reflected by the object; and determining the distance between the object and the proximity sensor based on removal of the noise from the light reflected from the object and a position of the first point in the image.

23. The method of claim 22, wherein the determining the distance comprises determining the distance between the object and the proximity sensor, using an angle at which the light is output toward the object, a distance between the proximity sensor and the focused light source, and the position of the first point in the image.

24. The proximity sensing method of claim 22, wherein the determining the distance comprises determining the distance between the object and the proximity sensor to be proportional to a distance from a side edge of the image, corresponding to the focused light source, to the position of the first point in the image.

25. The proximity sensing method of claim 22, wherein the determining the distance comprises determining the distance between the object and the proximity sensor to be proportional to a size of the image and a distance between the proximity sensor and the focused light source.

26. The proximity sensing method of claim 22, wherein the determining the distance comprises determining whether the object approximates the proximity sensor based on a movement direction of the first point in the image.

27. The proximity sensing method of claim 22, further comprising:

detecting a first event pattern of the light reflected from the object and incident with respect to the first pixel of the image and a second event pattern of the light reflected from the object and incident with respect to the second pixel of the image, wherein the identifying comprises identifying the first point in the image as light emitted by the focused light source and reflected by the object based on the first event pattern of the light reflected from the object and incident with respect to the first pixel of the image and identifying the second point in the image as the noise emitted by the other light source and reflected from the object based on the second event pattern of the light reflected from the object and incident with respect to the second pixel of the image.

28. The proximity sensing method of claim 27, wherein the identifying comprises distinguishing the first point from the noise generated by the other light source based on comparisons of the first event pattern to a temporal change of the light output by the focused light source and the second event pattern to the temporal change of the light output by the focused light source.

29. A non-transitory computer readable recording medium storing a program to cause a computer to execute the method of claim 22.

* * * * *